Nov. 17, 1953 H. R. MATHWICH 2,659,867

FREQUENCY MODULATED OSCILLATOR

Filed Oct. 10, 1951

INVENTOR
Howard R. Mathwich
BY
Charles H. Brown
ATTORNEY

Patented Nov. 17, 1953 2,659,867

UNITED STATES PATENT OFFICE 2,659,867

FREQUENCY MODULATED OSCILLATOR

Howard R. Mathwich, Haddonfield, N. J., assignor to Radio Corporation of America, a corporation of Delaware Application October 10, 1951, Serial No. 250,735

2 Claims. (Cl. 332—28)

This invention relates to a frequency modulated oscillator, and more particularly to such an oscillator useful in communications equipment.

This invention is particularly adapted for use in frequency modulated microwave communications equipment and it will be described in connection therewith. However, it is to be understood that this invention is also suitable for use in other surroundings and for other purposes.

In the copending Wheeler application, Serial #211,942, filed February 20, 1951, now Patent #2,653,315, dated September 22, 1953, a terminal station for a frequency modulated microwave communication system is disclosed. In order to transmit intelligence originating at such terminal station, a multiplex signal consisting of the intelligence in a plurality of communication channels is applied through an amplifier as the modulating signal input to a reactance modulator which is arranged to frequency modulate an oscillator. Telephonic intelligence originating at the terminal station, and used for maintenance or other purposes, may also be applied through the same amplifier to the reactance modulator. The frequency modulated output of the oscillator is heterodyned up to a microwave frequency in two separate steps, amplified and transmitted from the terminal station. The reactance frequency modulator and frequency modulated oscillator, which oscillator may have a center or rest frequency of 40 mc., for example, are denoted by reference letters B and C, respectively, in the said Wheeler application.

In the copending Thompson application, Serial #205,685, filed January 12, 1951, a repeater or relaying station for a frequency modulated microwave communication system is disclosed. Generally, the multiplex signal received at such repeater station is heterodyned down in frequency, amplified, then heterodyned back up in frequency in two separate steps, amplified and retransmitted from the repeater station. However, provision is made at the repeater station for dropping channels from the received signal or adding channels to the outgoing signal, as well as adding other intelligence such as telephonic (e. g., maintenance) or fault-indicating intelligence to the signal radiated from the repeater station. In order to add to the outgoing signal, intelligence of various types originating at the repeater station, the intelligence to be so added is fed through an amplifier as the modulating signal input to a reactance modulator which is arranged to frequency modulate an oscillator. The frequency modulated output of this oscillator is used as one of the heterodying signals for the signal passing through the repeater station; as a result, the intelligence originating at the repeater station is added onto the outgoing signal and is radiated from the repeater station. The reactance modulator and frequency modulated oscillator, which may again have a center or rest frequency of 40 mc., for example, are denoted by reference letters B and C, respectively, in the said Thompson application.

It is highly desirable, from the standpoint of effecting transmission of a maximum number of intelligence channels, that the frequency modulated oscillator referred to be capable of response over a broad band of frequencies, such as a band extending from 300 cycles to 110 kilocycles, as given by way of example in the aforementioned Wheeler and Thompson applications.

Therefore, an object of the present invention is to devise a novel frequency modulated oscillator which is capable of faithful response over a very broad band of frequencies.

Another object is to provide a novel means for generating frequency modulated signals with high deviation and low distortion.

A further object is to devise a frequency modulated oscillator with a novel feedback circuit which linearizes the modulation characteristic of the oscillator.

The foregoing and other objects of the invention will be best understood from the following description of an exemplification thereof, reference being had to the accompanying drawings, wherein.

Figures 1, 2, 3:
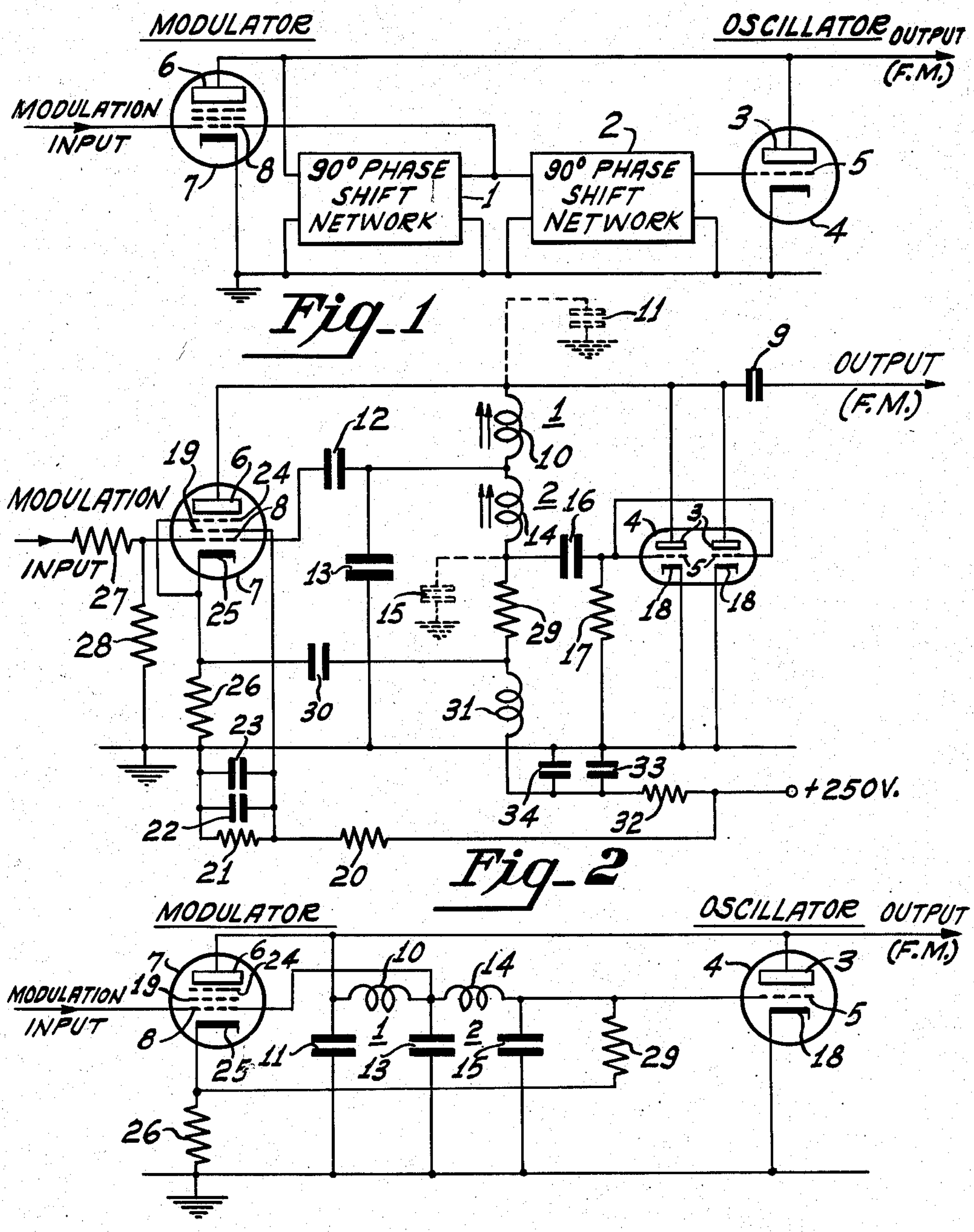
Fig. 1 is a block diagram of a basic phase shift reactance tube modulated oscillator.
Fig. 2 is a detailed schematic of a circuit according to this invention.
Fig. 3 is a simplified schematic of the circuit of Fig. 2.

Briefly, the objects of this invention are accomplished in the following manner: An LC reactance-tube-modulated phase shift oscillator is utilized, with a resistor terminating the phase shift feedback network which network is connected between the anode and grid of the oscillator tube. Feedback at the oscillator (carrier) frequency from the oscillator tube to the reactance tube is effected by connecting one end of the terminating resistor to the cathode of the reactance tube, rather than to ground. The feedback is effected through the cathode resistor of the modulator tube or reactance tube.

The oscillator of this invention is related to the LC reactance tube modulated phase shift oscillator described in a paper entitled "Reactance Tube Modulation of Phase Shift Oscillators," appearing in The Bell System Technical Journal for October 1949, volume XXVIII, No. 4, pages 601 to 607. In ordinary reactance tube modulated oscillators, the input and output of a vacuum tube amplifier are connected together by a tuned circuit and feedback network which introduces 180° phase shift at the rest or undeviated frequency of the amplifier than functioning as an oscillator. An auxiliary path contains the reactance tube the grid of which is fed through a 90° phase shift network from the oscillator output. The theory of such reactance tube modulated oscillators is well-known to those skilled in the art.

Now referring to Fig. 1, which is a block diagram of a basic reactance tube modulated phase shift oscillator, two 90° phase shift networks 1 and 2 are connected effectively in cascade between the anode 3 or output electrode or oscillator tube or electron control device 4 and the grid or input electrode 5 of this same control device or tube, thus providing the 180° phase shift required for oscillation. The anode or electron-receiving electrode 6 of the reactance modulator electron flow device, electron discharge device or tube 7 is connected directly to oscillator anode 3, while the output side of network 1 is coupled to grid 8 of the tube 7, to which the modulating voltage is also supplied. Grid 8 may be termed a control electrode.

The two phase shift networks 1 and 2 provide a 180° phase shift in the oscillator anode-to-grid feedback path. The 90° phase shift network required and used in the reactance tube grid circuit is network 1, which is a portion of the oscillator feedback network and which provides half of the 180° phase shift required for oscillation. With the requisite gain in the oscillator tube 4, the circuit oscillates at the frequency for which the phase shift in networks 1 and 2, taken together, is 180°, this being the rest or center frequency of the oscillator. The modulator tube 7 samples the oscillator radio frequency energy after only 90° of phase shift (in network 1), amplifies it and feeds it back into the circuit, thus varying or deviating the frequency of the oscillator in accordance with the instantaneous gain of the modulator tube 7. The tube 7 thus acts as an electronic simulated reactance, and its instantaneous gain is determined, in part, by the instantanous voltage on grid 8 of said tube and this instantaneous grid voltage is varied by the input modulating voltage applied to such grid. In this way, frequency modulation of the oscillator 4 is accomplished in response to the modulating signal applied to grid 8 of the reactance tube. The direction of deviation is determined by whether the phase of the reactance tube grid voltage leads or lags the reactance tube anode voltage. If the networks 1 and 2 cause the phase of the reactance tube grid voltage to lead the reactance tube anode voltage the oscillator frequency increases, while if the phase of the reactance tube grid voltage is caused to lag the reactance tube anode voltage the oscillator frequency decreases, each of these frequency changes corresponding to the modulator grid's going more positive.

Fig. 2 is a detailed schematic of a practical circuit according to this invention. In Fig. 2, parts the same as those in Fig. 1 are denoted by the same reference numerals. The oscillator vacuum tube 4, which may be a twin-triode type 12AT7, for example, having its triode elements connected in parallel as illustrated, has its anodes 3 coupled to provide frequency modulated output through a coupling capacitor 9 to a suitable utilization circuit. In a typical circuit according to this invention which was actually built and tested, the oscillator had a center or rest frequency of 40 megacycles (mc.). The 90° phase shift network 1, which is coupled to the oscillator anodes 3, consists of an LC circuit including inductance 10, capacitor 13, and capacitor 11. One end of inductance 10 and one side of capacitor 11 are connected to anodes 3, while the opposite side of capacitor 11 is grounded. Elements 10, 11 and 13 have such values as to provide a phase shift of substantially 90° to 40 mc. Capacitor 11 is shown dotted because, in a typical circuit, its capacitance was made up of tube interelectrode capacitances, tube socket capacitances and other stray capacitances. At 40 mc. the required phase shift may readily be obtained with such small capacitances.

The lower end of inductance 10 (the output of phase shift network 1) is coupled through a capacitor 12 to control grid 8 of the reactance vacuum tube 7, which may be a pentode type 6AH6, for example. In this way, a 90° phase-shifted 40-mc. voltage is applied to the grid of the reactance tube, this grid voltage being shifted 90° with respect to the 40 mc. voltage applied to anode 6 of tube 7, since such anode is connected directly to anodes 3 of the oscillator. The 90° LC phase shifting network 1 also utilizes part of the capacitance of a capacitor 13, which is connected from the lower end of inductance 10 to a point of fixed zero reference potential or ground. For proper operation, the capacitance of capacitor 13 should be approximately twice that of capacitor 11.

The 90° phase shift network 2, which is coupled in cascade fashion to network 1, consists of an LC circuit including a part of capacitor 13 (previously referred to), inductance 14, capacitor 15, and terminating elements including resistor 29 and resistor 26. One end of inductance 14 is connected to the common junction point of inductance 10, capacitor 12 and capacitor 13, while the opposite (lower) end of inductance 14 is connected to one side of the capacitor 15, the opposite side of this capacitor being grounded. Elements 13, 14, 29, 26 and 15 have such values as to provide a phase shift of substantially 90° at 40 mc. Capacitor 15 preferably has the same capacitance as does capacitor 11, and is shown dotted because, in a typical circuit, like capacitor 11 its capacitance was made up of tube interelectrode capacitances, tube socket capacitances and other stray capacitances. At 40 mc. the required phase shift may readily be obtained with such small capacitances.

In order to complete the feedback circuit between the anodes 3 and grids 5 of the oscillator, and to provide the required 180° phase shift in the oscillator feedback path, the lower end of inductance 14 (the output of phase shift network 2) is connected through a coupling capacitor 16 to the grids 5 of tube 4. Since networks 1 and 2 each provide a phase shift of 90° at the oscillator frequency, and since these networks are cascaded between the anode 3 and the grid 5 of the oscillator, the required 180° phase shift is provided between the oscillator anode (output electrode) and grid (input electrode). The usual grid leak resistor 17 is provided between the grid side of capacitor 16 and ground, while the cathodes 18 of tube 4 are connected directly to ground.

The screen grid 19 of modulator tube 7 is connected through a resistor 20 to the positive terminal of a source of unidirectional potential, of 250 volts, for example. A bypassing network, consisting of a resistor 21 and two capacitors 22 and 23 arranged in parallel, is connected between screen grid 19 and ground. The suppressor grid 24 of tube 7 is connected to its cathode 25, while to complete the anode-cathode circuit of this tube the cathode 25 is connected through a resistor 26 to ground, which is a point of fixed (zero) reference potential. The negative side of the unidirectional potential source is also grounded, as is common practice in electronic circuits of this type. The cathode 25 may be termed an electron-emitting electrode, since during operation electrons are emitted therefrom.

The modulation input signal is supplied to control grid 8 of reactance tube 7 through a resistor 27, while a resistor 28 is connected from this grid to ground.

In order to provide feedback as described hereinafter, and to terminate the phase shift network 2, a resistor 29 is connected at one end to the lower end of inductance 14 and the opposite end of this resistor is connected through a capacitor 30 to the cathode 25 and the upper ungrounded end of cathode resistor or cathode impedance 26. The common junction of resistor 29 and capacitor 30 is connected through a choke or inductor 31 and a resistor 32 to the positive 250-volt terminal. In this way, through elements 32, 31, 29, 14 and 10, unidirectional anode potential is supplied from the positive 250-volt terminal to anodes 3 and 6 of tubes 4 and 7. Finally, to complete the circuit being described, two parallel capacitors 33 and 34 are connected from the common junction of choke 31 and resistor 32 to ground.

Fig. 3 is a simplified, somewhat idealized schematic diagram of the circuit arrangement of Fig. 2, with no direct current or non-essential components included. In Fig. 3, reference numerals the same as those of Fig. 2 are used to refer to the same components. The leftmost and rightmost capacitors 11 and 15 in Fig. 3 are composed of the stray capacitances previously referred to. The capacitor 30, which may have a capacitance of 500 mmfd. for example, has a very low impedance at 40 mc. and has therefore been omitted from Fig. 3.

As may be seen from Fig. 3, resistor 29 is a termination element for the phase shift networks. The total termination resistance for the networks consists of the sum of the resistance of 29 and the parallel combination of resistor 26 and the cathode impedance of the modulator tube 7.

From an examination of Figs. 2 and 3, it may be seen that the two phase shift networks (one comprising elements 10, 11 and 13 and the other comprising elements 13, 14, 15, 29 and 26) effectively in cascade provide a 180° phase shift in the feedback path between the oscillator anode 3 and the oscillator grid 5. With the requisite gain in oscillator tube 4, the circuit including this tube oscillates at the frequency for which the phase shift in the two phase shift networks, taken together, is 180°. The 90° phase shift required for the reactance tube grid circuit is obtained by coupling the midpoint of the two phase shift networks to the grid 8 of reactance tube 7. The coupling capacitor 12, which may have a capacitance of 68 mmfd. for example, has a rather low impedance at 40 mc. and has therefore been omitted from Fig. 3. The modulator tube 7 samples the oscillator radio frequency energy after 90° of phase shift, amplifies it and feeds it back into the circuit, thus deviating the frequency of the oscillator in accordance with the instantaneous gain of modulator tube 7, which gain is in turn varied by the input modulating voltage applied to grid 8 of this tube. Thus, frequency modulation of the oscillator 4 is effected by the modulating signal input applied to grid 8.

According to this invention, an important improvement in linearization of the modulation frequency characteristic is obtained by connecting the lower end of resistor 29, which terminates the phase shift network, not to ground but instead through the capacitor 30 to the upper end of the cathode resistor 26 of the modulator tube 7. As previously stated, the capacitor 30 has a capacitance such as to provide a very low impedance at 40 mc., so that the lower end of resistor 29 can be considered as being substantially directly connected to cathode 25 and to the upper end of resistor 26, the capacitor 30 having very low impedance and negligible phase shift for a 40-mc. wave passing therethrough. If the lower end of resistor 29 were connected to ground, no feedback would exist after the 180° phase shift has been effected in the two cascaded phase shift networks; however, with the connection of resistor 29 to cathode resistor 26, a 40-mc. voltage, which is substantially 180° out of phase with the voltage fed to anode 6 of tube 7, is fed to cathode 25 of this tube. The 180° phase shift between the anode and cathode radio frequency voltages of tube 7 is of course provided by the phase shift networks 1 and 2. The feedback effect thus introduced into the cathode circuit of the modulation tube 7 makes a higher deviation possible, for a given modulation distortion, than would be possible with the lower end of resistor 29 connected to ground.

The bottom of the 180-ohm resistor 29 is connected to ground through a 10 microhenry choke or inductor 31 and a 10 mfd. capacitor 34 in series. At audio or modulating frequencies the impedance of inductor 31 is rather small, as is also the impedance of capacitor 34. Capacitor 33 may have a capacitance of 1500 mmfd., which is low enough to be negligible as compared to the capacitance of parallel capacitor 34. The bottom of resistor 29 is held substantially at ground potential for audio or modulating frequencies, due to the low-impedance ground path described. Therefore, there is substantially no feedback to cathode resistor 26 at audio or modulating frequencies. At the 40-mc. carrier frequency, however, the impedance of inductor 31 is quite high. Therefore, the bottom of resistor 29 is kept at a rather high potential with respect to ground for 40 mc., so that feedback at 40 mc. to cathode resistor 26 readily takes place.

For a particular circuit according to this invention which was built and successfully tested, the center frequency of the oscillator was 40 mc., the peak deviation was ±1.5 mc., the modulation distortion was 0.5%, the modulation sensitivity was 0.75 volt rms. for ±1.5 mc. peak deviation and the frequency was ±1 db from 300 cycles to 110 kc. Thus it may be seen that a high-deviation, low-distortion frequency modulated oscillator has been devised.

Although this invention is not to be deemed limited in any way thereby, the following component values are given by way of example, in addition to those previously given. These were the values used in a circuit built according to this invention and successfully tested.

| | | |
|---|---|---|
| Resistor 17 | ohms | 22,000 |
| Resistor 20 | do | 47,000 |
| Resistor 21 | do | 100,000 |
| Resistor 26 | do | 1,000 |
| Resistor 27 | do | 10,000 |
| Resistor 28 | do | 100,000 |
| Resistor 32 | do | 4,700 |
| Capacitor 9 | mmfd | 1.5 |
| Capacitor 13 | mmfd | 6.8 |
| Capacitor 16 | mmfd | 100 |
| Capacitor 22 | mfd | 0.047 |
| Capacitor 23 | mmfd | 800 |

Inductor 10 was twelve turns #28 wire on a $\frac{5}{16}$'' diameter coil form, spaced to fill ⅜''. Inductor 14 was thirteen turns #28 wire on a $\frac{5}{16}$'' diameter coil form, spaced to fill ⅜''. Both inductor 10 and inductor 14 were tuned by threaded powdered iron cores to the exact desired value of inductance.

What is claimed is:

1. An oscillator circuit comprising an electron control device having input and output electrodes, a feedback phase shift network connected between said input and output electrodes, said network being effective to cause a phase shift of 180° for a predetermined frequency, whereby said device produces oscillations of said predetermined frequency, an electron discharge device including anode, cathode and control electrodes, means coupling one end of said network to said anode, a cathode impedance connected in series with said cathode, a resistor having one end connected to the opposite end of said network, a connection between the other end of said resistor and said cathode impedance, and means coupling an intermediate point on said network to said control electrode.

2. An oscillator circuit comprising an electron control device having input and output electrodes, a feedback phase shift network connected between said input and output electrodes, said network being effective to cause a phase shift of 180° for a predetermined frequency, whereby said device produces oscillations of said predetermined frequency, an electron discharge device including anode, cathode and control electrodes, means for applying a modulating voltage to said control electrode, means coupling one end of said network to said anode, a cathode impedance connected in series with said cathode, a resistor having one end connected to the opposite end of said network, a connection between the other end of said resistor and said cathode impedance, means coupling an intermediate point on said network to said control electrode, and impedance means coupling said other end of said resistor to a point of zero reference potential, said impedance means having low impedance for voltages of modulating frequency but high impedance for voltages of said predetermined frequency.

HOWARD R. MATHWICH.

References Cited in the file of this patent

UNITED STATES PATENTS

| Number | Name | Date |
|---|---|---|
| 2,445,508 | Beleskas | July 20, 1948 |
| 2,486,265 | Dennis | Oct. 25, 1949 |